United States Patent [19]

Ortiz, Jr.

[11] Patent Number: 5,245,682
[45] Date of Patent: Sep. 14, 1993

[54] FIBER OPTIC DELIVERED BEAM QUALITY CONTROL SYSTEM FOR POWER LASERS

[75] Inventor: Angel L. Ortiz, Jr., Scotia, N.Y.

[73] Assignee: General Electric Company, Schenectady, N.Y.

[21] Appl. No.: 950,567

[22] Filed: Sep. 25, 1992

[51] Int. Cl.$^5$ ............................................... G02B 6/32
[52] U.S. Cl. ......................................... 385/33; 385/38
[58] Field of Search ................. 385/117, 118, 119, 38, 385/33

[56] References Cited

U.S. PATENT DOCUMENTS

| | | | |
|---|---|---|---|
| 3,419,321 | 12/1968 | Barber et al. | 219/120.75 |
| 4,275,288 | 6/1981 | Makosch . | |
| 4,564,736 | 1/1986 | Jones et al. | 385/127 |
| 4,676,586 | 6/1987 | Jones et al. | 385/127 |
| 4,681,396 | 7/1987 | Jones | 385/147 |
| 4,799,755 | 1/1989 | Jones | 385/33 |
| 4,844,574 | 7/1989 | Chande | 385/33 |
| 4,984,885 | 1/1991 | Ortiz, Jr. | 385/38 |
| 4,997,250 | 3/1991 | Ortiz, Jr. | 385/33 |

OTHER PUBLICATIONS

"On-The-Fly Drilling with a Fiber Delivered Face Pumped Laser Beam", by A. L. Ortriz, Jr., reprint from Journal of Laser Applications, Spring/Summer 1992, vol. 4, No. 2, pp. 15–24.

Primary Examiner—John D. Lee
Assistant Examiner—Phan T. Heartiney
Attorney, Agent, or Firm—James R. McDaniel; Paul R. Webb, II

[57] ABSTRACT

This invention relates to an apparatus and method for providing control of high power laser/fiber delivered beam quality. Such structures of this type, generally, allow the parameters of a high power fiber delivered beam to be determined such that the high power laser beam is injected into an optical fiber with the appropriate focal length lens.

8 Claims, 6 Drawing Sheets

FIBER OPTIC DELIVERED BEAM QUALITY CONTROL SYSTEM FOR POWER LASERS

BACKGROUND OF THE INVENTION

1. Field of the Invention

This invention relates to an apparatus and method for providing control of high power laser/fiber delivered beam quality. Such structures of this type, generally, allow the parameters of a high power fiber delivered beam to be determined such that the high power laser beam is injected into an optical fiber with the appropriate focal length lens.

2. Description of the Related Art

Laser materials processing as known in the art and as used herein refers to performance of materials processes, such as cutting, welding, drilling and soldering, with a high a power continuous wave or pulsed laser beam. The average power of a high power laser beam may range from as little as approximately 1 watt to hundreds of watts. A user selects the specific power of the beam on the basis of a particular process being performed.

Known art describes transmitting a laser beam from a laser source to the vicinity of a workpiece by means of an optical fiber. For example, an apparatus and method for injecting a power laser beam into an optical fiber for transmission therethrough are described in commonly assigned U.S. Pat. Nos. 4,564,736, 4,676,586, and 4,681,396, respectively entitled "Industrial Hand Held Laser Tool and Laser System", "Apparatus and Method for Performing Laser Material Processing Through a Fiber Optic", and "High Power Laser Energy Delivery System", the disclosure of each of these patents being incorporated in their entirety herein by reference.

Transmitting a laser beam through an optical fiber to an output coupler also is known. Such an apparatus is described in commonly assigned U.S. Pat. No. 4,799,755, entitled "Laser Materials Processing with a Lensless Fiber Optic Output Coupler", the disclosure of which is incorporated in its entirety herein by reference. In the apparatus described in U.S. Pat. No. 4,799,755, lens systems are not utilized in an output coupler. Rather, a fiber injecting lens is selected to have a focal length of sufficient length to enable the use, for materials processing, of the diverging beam emitted at an output end of the fiber without a need for a beam focusing lens-type output coupler.

An output coupler having a lens system therein for focusing a laser beam transmitted thereto through an optical fiber is disclosed in commonly assigned U.S. Pat. No. 4,844,574, entitled "Optical Fiber Output Coupler for a Power Laser", the disclosure of which is incorporated in its entirety herein by reference. The apparatus described in U.S. Pat. No. 4,844,574 includes a lens system that compensates for adverse effects of fiber transmission in order to improve focused spot power density of the fiber transmitted beam.

Still other known laser material processing systems utilize lens systems at an output of a laser source. Such systems are described in commonly assigned U.S. Pat. Nos. 3,419,321 and 4,275,288, entitled "Laser Optical Apparatus for Cutting Holes" and "Apparatus for Machining Material", respectively. In each of these systems, optical fibers are not utilized. Therefore, since a laser source generally is a stationary system, at least during a materials processing operation, lenses are aligned with the beam directly output by the laser source. The mobility of such systems is limited, therefore, the need for high power fiber optic beam delivery. If this laser beam is not properly delivered to the output coupler from the fiber output, the quality of the beam emitted from the output coupler will be adversely affected. Therefore, a more advantageous system, then, would be presented if the fiber optic delivered beam quality could be improved.

It is apparent from the above there exists a need in the art for a fiber optic delivered laser beam control system for power lasers which is capable of adequately delivering the beam to the output coupler, and which at least equals the delivered characteristics of the known high power laser energy delivery systems, particularly, those of the highly advantageous type disclosed in the above-referenced Jones patent, but which at the same time substantially increases the quality of the fiber optic delivered beam. It is a purpose of this invention to fulfill this and other needs in the art in a manner more apparent to the skilled artisan once given the following disclosure.

SUMMARY OF THE INVENTION

Generally speaking, this invention fulfills these needs by providing a fiber optic delivered beam quality control system for power lasers, comprising a laser head means which produces a first laser beam, a laser power supply means operatively connected to said laser head means, a laser control means operatively connected to said laser head means and said laser power supply means, an optical control means operatively connected to said laser control means such that said optical control means moves into and out of alignment with said first laser beam to create a second laser beam, a fiber holder means having an optical fiber such that said second laser beam contacts said optical fiber, and a fiber output means operatively connected to said optical fiber.

In certain preferred embodiments, the optical control means is comprised of at least two plano-convex injection lenses attached to high speed solenoids. Also, the control means operates the solenoids to move the injection lenses into and out of alignment with the first laser beam. Finally, the fiber holder means includes a manipulator which allows the second laser beam to be properly focused upon the receiving end of the optical fiber.

In other preferred embodiments, the fiber optic delivered beam quality is precisely controlled such that the laser beam which is emitted from the fiber output has an improved beam quality.

The preferred fiber optic delivered beam quality control system, according to this invention, offers the following advantages: increased quality of the beam delivered from the fiber output; good stability; good durability; ease of optical alignment; good economy; and provides improved fiber delivered laser materials processing capability. In fact, in many of the preferred embodiments, these factors of increased beam quality from the fiber output and ease of optical alignment are optimized to an extent that is considerably higher than heretofore achieved in prior, known high power laser and fiber optic energy delivery systems.

BRIEF DESCRIPTION OF THE DRAWINGS

The above and other features of the present invention which will be more apparent as the description proceeds are best understood by considering the following detailed description in conjunction with the accompanying drawings wherein like character represent like parts throughout the several veins and in which.

DETAILED DESCRIPTION OF THE INVENTION

Figure 1:
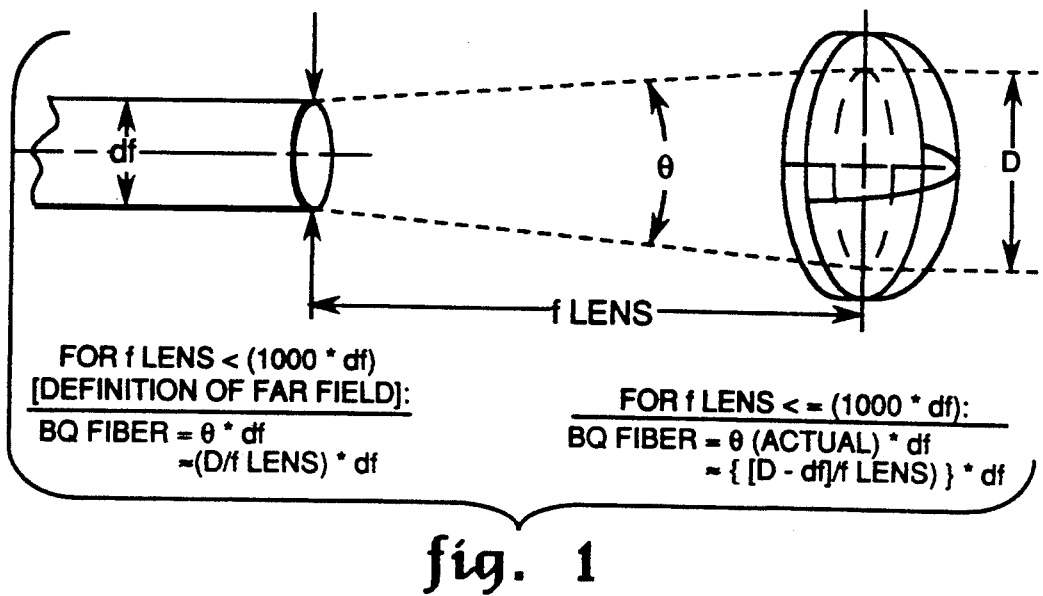
FIG. 1 is a diagrammatic illustration showing the characterization of fiber delivered beam quality, according to the present invention.

With reference first the FIG. 1, there is illustrated a diagrammatic drawing of fiber delivered beam quality. A characterization of the fiber output beam quality is achieved by measuring the fiber output beam divergence (full angle). The fiber delivered beam quality is determined by first calculating the fiber output for angle beam divergence ($\theta$). This is calculated by:

$$\theta = \tan^{-1}(D/f) \tag{1}$$

where $\tan^{-1}$ (D/f) is in mrads, D is the measured $1/e^2$ collimated beam diameter on the collimating lens in millimeters and f is the collimating lens focal length used for characterization in mm. Equation (1) can be approximated by $\theta \approx$ (D/f) for small angles. The fiber delivered BQ is now determined by:

$$BQ_{fib} = \theta * df \tag{2}$$

where df is the fiber diameter in mm. It is obvious that as the fiber output divergence decreases, the fiber delivered beam quality improves. The lower the beam quality number (millimeter-milliradians) the better the beam quality. The fiber delivered beam quality also can be improved by using smaller diameter fibers.

Figure 2:
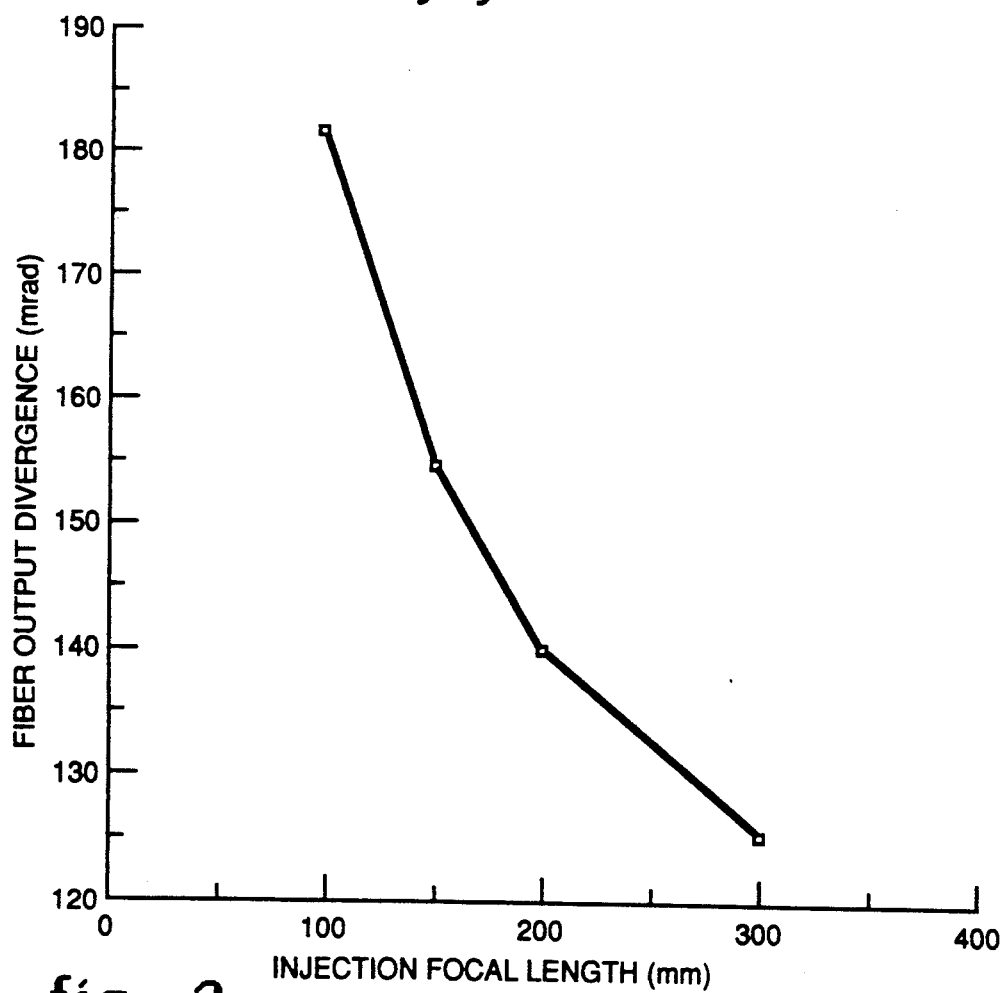
FIG. 2 is a graphical illustration of fiber optic divergence versus injection focal length.
Figure 3:
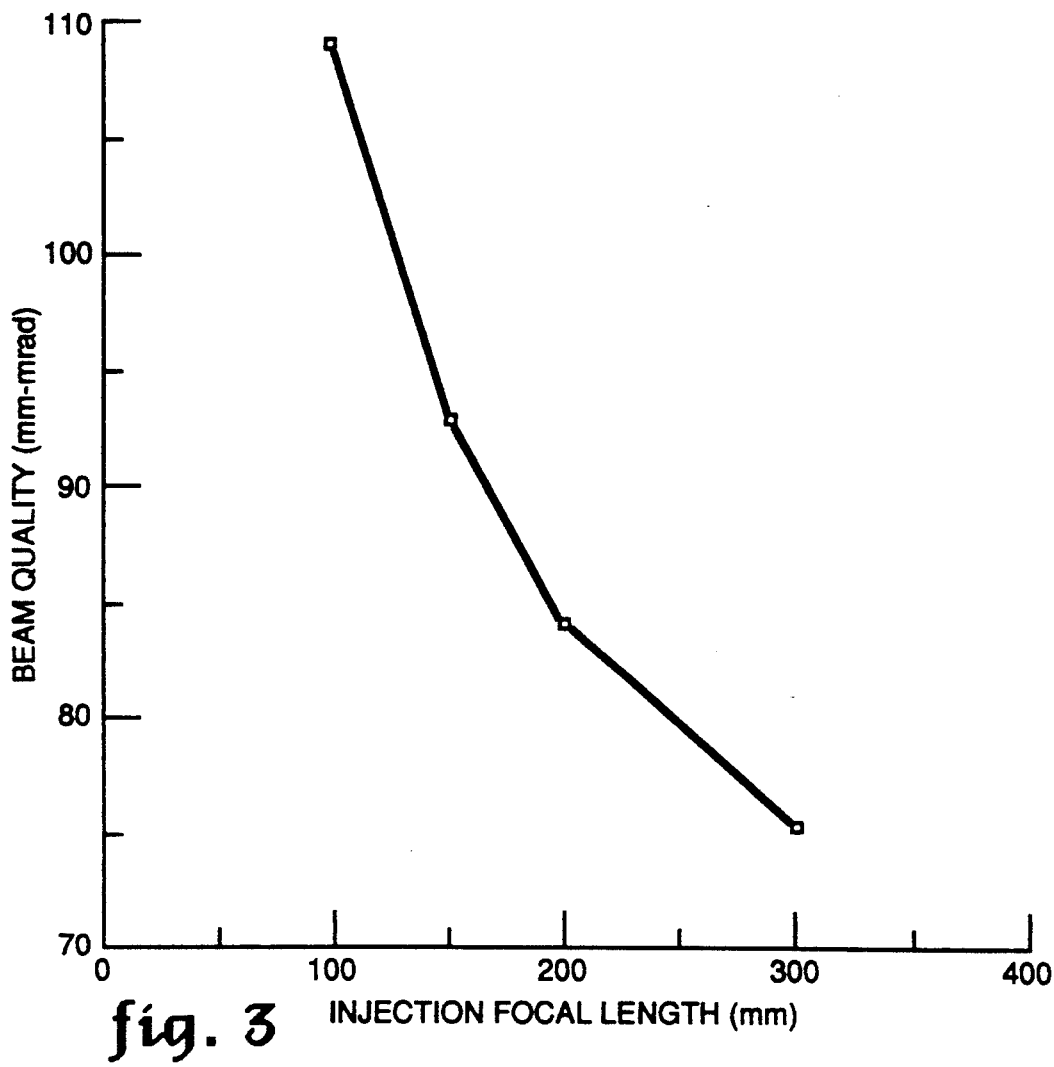
FIG. 3 is a graphical illustration of fiber delivered beam quality versus injection focal length.

It has been found that the fiber output divergence decreases as the focal length of the high power laser beam injection lens increases as shown in FIG. 2. Likewise, the fiber delivered beam quality is improved with longer injection lenses as shown in FIG. 3. As longer injection focal length lenses are used, the laser beam injection cone angle decreases. With fiber injection lenses ranging from 100 mm to 300 mm, the fiber delivered beam quality ranges from 110 mm-mrad to 75 mm-mrad for a conventional anhydraguide, fused silica core, 600 micron diameter step index fiber.

Figure 4:
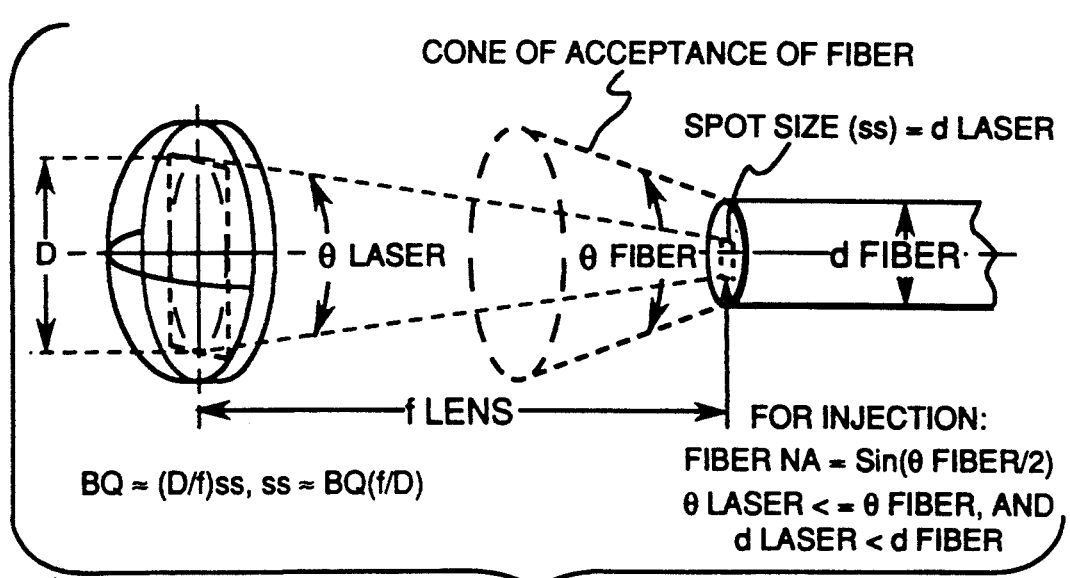
FIG. 4 is a diagrammatic illustration of the fundamentals used for laser injection into an optical fiber with a plano-convex lens.

FIG. 4 illustrates the fundamentals of laser injection into an optical fiber. A power laser beam with a beam quality (BQ) has a beam diameter (D) on the plano-convex lens. The simple formulae:

$$BQ = \tan^{-1}(D/f) * ss, \text{ and} \tag{3}$$

$$FiberNA = \sin(\phi_{Fiber}/2) \tag{4}$$

where BQ equals the laser source beam quality in mm-mrad, $\tan^{-1}$ (D/f) is in radians, D equals $1/e^2$ laser beam diameter on the focusing lens in mm, f equals injection lens focal length in mm, ss=laser beam focus spot size (diameter) on the fiber tip in microns, Fiber NA defines the fiber numerical aperture, and $\phi_{Fiber}$ describes the acceptance cone angle of the fiber, provide the fundamental theory for high power laser injection into fibers. Equation (3) can be approximated by $BQ \approx (D/f) * ss$ because $\tan^{-1}(D/f) \approx D/f$ for small angles. Solving for ss provides:

$$ss = BQ/\tan^{-1}(D/f) \tag{5}$$

Close approximation of equation (5) will reveal the standard equation used in laser focused spot size calculations as indicated by:

$$W_o = f * \theta \tag{6}$$

where $W_o$ equals a focused laser spot radius, f equals the focusing lens focal length, and $\theta$ equals the laser half angle beam divergence. For equation (5), BQ is in mm-mrad, $\tan^{-1}$(D/f) is in radians thereby cancelling out the radians in the BQ term leaving the spot size dimension as $mm \times 10^{-3}$ or microns. For successful fiber injection:

$$\phi_{Laser} < = \phi_{Fiber} \tag{7}$$

and $$d_{Laser} < d_{Fiber} \tag{8}$$

where $\phi_{Laser}$ defines the injection cone angle of the laser beam injecting the fiber, $\phi_{Fiber}$ describes the acceptance cone angle of the fiber, $d_{Laser}$ describes the diameter of the focused laser beam on the fiber input face, and $d_{Fiber}$ is the fiber core diameter in FIG. 4. The fiber numerical aperature (NA) is typically determined by the fiber core and cladding material used in the fiber optic manufacturing process.

Figure 5A:
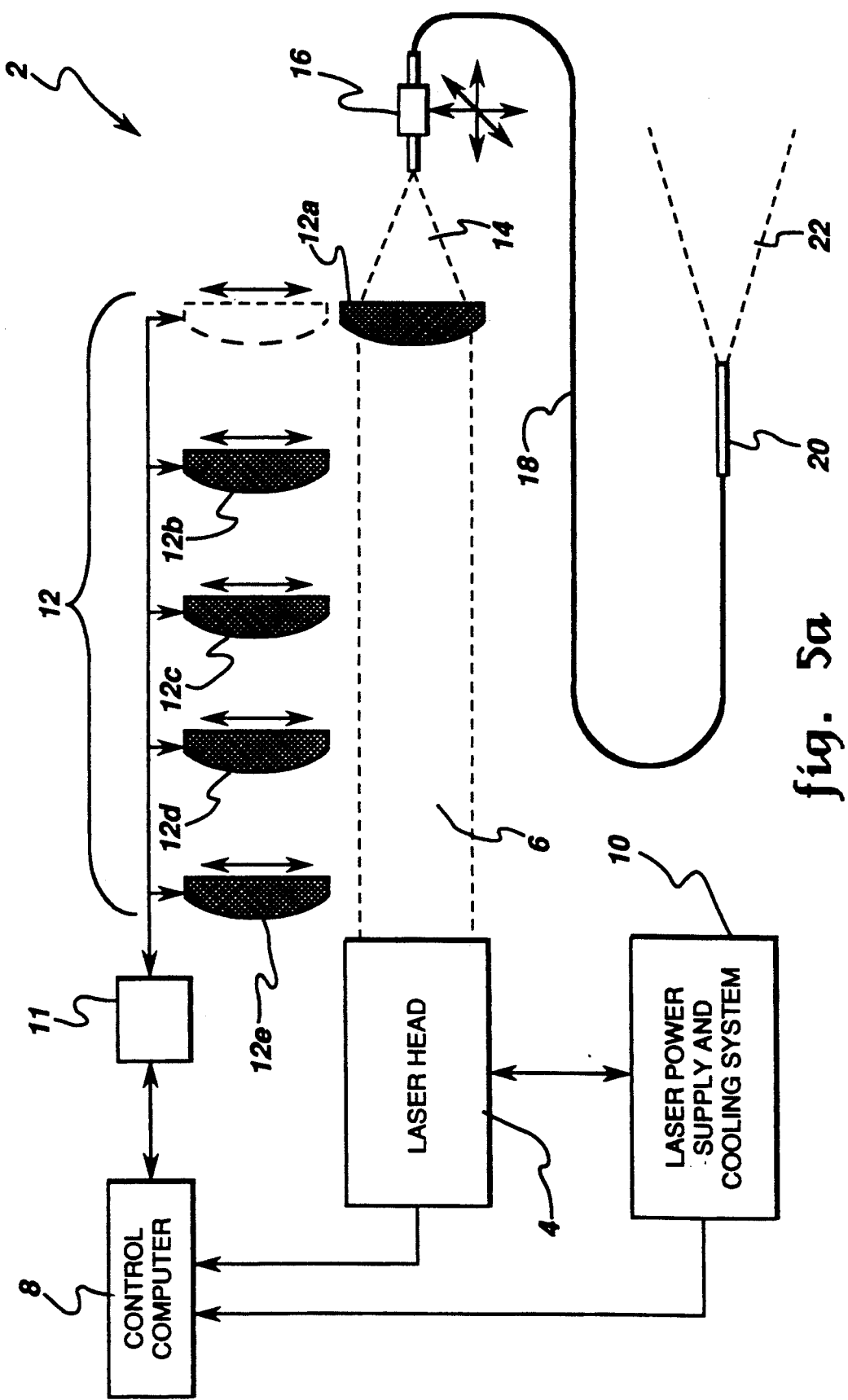
FIGS. 5a-5c are schematic illustrations of a fiber optic delivered beam quality control system for power lasers with plano-convex injection lenses of various focal lengths aligned with the laser beam, according the present invention.
Figure 5B:
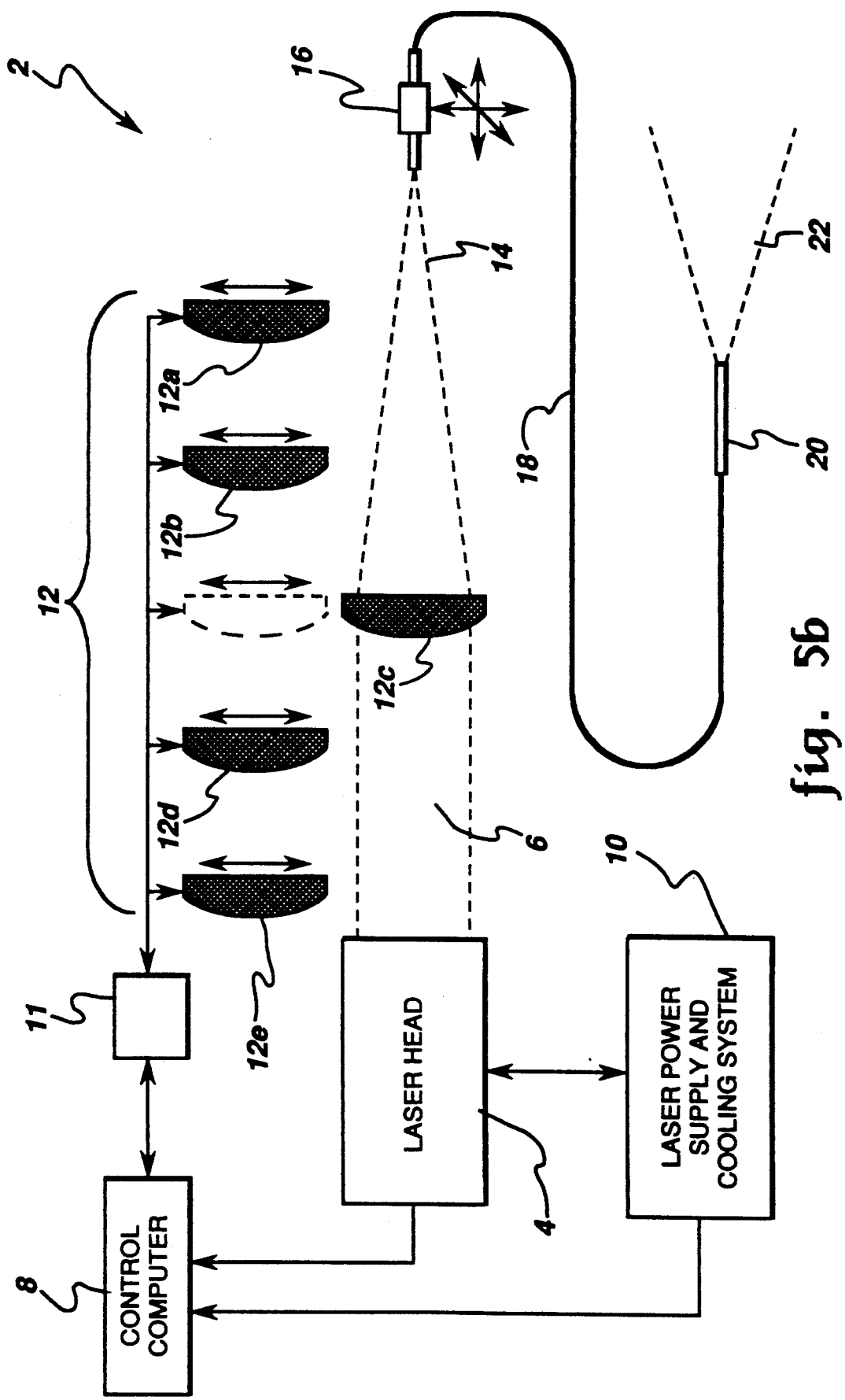
Figure 5C:
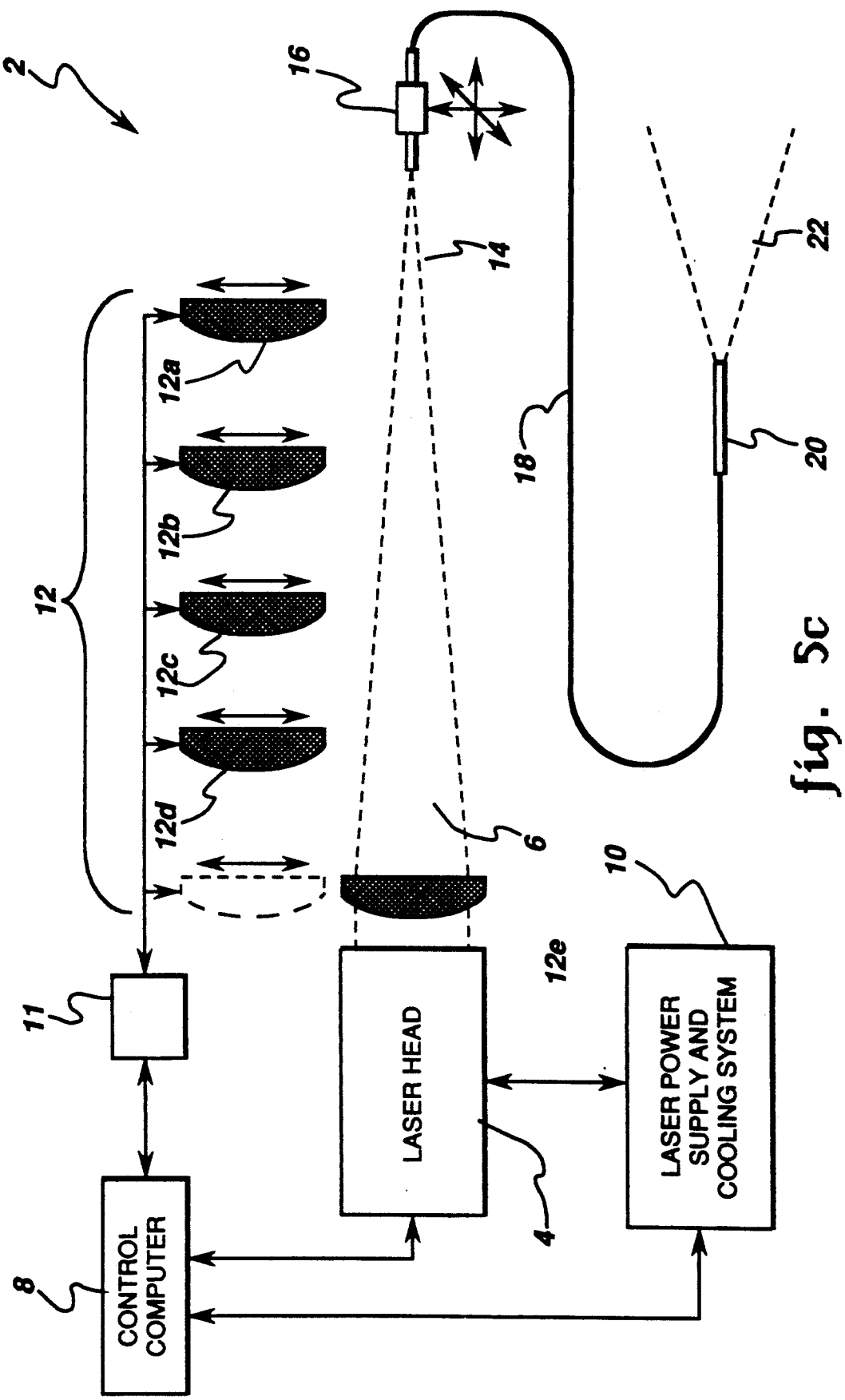

The preferred embodiment is shown in FIGS. 5a-5c. As shown in FIG. 5a, fiber delivered beam quality control system 2 includes, in part, conventional laser head 4, collimated laser beam 6, conventional computer control 8, conventional laser power supply and cooling system 10, conventional high speed solenoids 11, injection lenses 12, laser beam 14, conventional fiber holder and manipulator 16, conventional power fiber 18, fiber output 20, and laser beam 22. In particular, injection lenses 12 include at least five plano-convex injection lenses (12a-12e) of varying focal lengths. Preferably, these focal lengths are 100 mm, 150 mm, 200 mm, 250 mm, and 300 mm for injection lenses 12a-12e, respectively but may be not so limited. Longer injection lenses greater than 300 mm can be used provided that the focused laser beam spot size is smaller than the fiber injection face. Lenses 12a-12e are operatively connected to conventional high speed solenoids 11 by conventional attachments (not shown). Fiber holder and manipulator 16, preferably, allows power fiber 18 to be moved such that laser beam 14 is properly delivered to the receiving end of power fiber 18 as power fiber 18 is held in fiber holder and manipulator 16. Also, fiber output 20, preferably, is any suitable output coupler such as that described in commonly assigned U.S. Pat.

Nos. 4,844,754 and 4,997,250 entitled "Optical Fiber Output Coupler for a Power Laser", and "Fiber Output Coupler with Beam Shaping Optics for Laser Material Processing System", respectively. As can be seen in FIG. 5a, lens 12a is aligned in collimated laser beam 6 in order to form laser beam 14 which is directed to the fiber input face mounted on fiber holder 16. Laser beam 14 is then transported through power fiber 18, and out fiber output 20 to form delivered laser beam 22.

FIGS. 5b and 5c show systems 2 which are similar to the system 2 illustrated in FIG. 5a. However, FIG. 5b shows that now lens 12c is aligned in collimated laser beam 6 in order to form laser beam 14 that is delivered to the fiber input face mounted on the fiber holder and manipulator 16. Finally, FIG. 5c shows lens 12e aligned with collimated laser beam 6 in order to form laser beam 14 which is delivered to the fiber input face mounted on the fiber holder and manipulator 16.

During the operation of system 2, any one of lenses 12a-12e or a combination thereof are aligned with laser beam 6 in order to form laser beam 14. This alignment of lenses 12a-12e with laser beam 6 results in laser beam 22 of varying input cone angles being formed. For example, when the process calls for good fiber delivered beam quality (as in deep hole drilling), the longest focal length lens, for example, the 300 mm (lens 12e) is placed in placed in front of laser beam 6, and fiber 18 is translated by holder 16 such that the distance from the face of fiber 18 to the injection lens 12e matches the lens focal length. The pulse length of laser 4 in pulsed lasers determines if drilling or welding can be performed. Laser pulse lengths less than or equal to 2 milliseconds are, typically, used for drilling and cutting. Likewise, laser pulse lengths greater than 2 milliseconds out to continuous wave are, typically, used for surface heat treating and welding. When the process calls for a poorer fiber derivered beam quality, such as for shallow spot, tack or seam welding or surface heat treating, the lens array positions the shortest injection lens, for example, the 100 mm (lens 12a) while simultaneously, the fiber 18 is translated by holder 16 to match the lens focal length and the laser pulse length is adjusted accordingly.

Laser characteristics data is stored in a software lookup table which is prepared by well known techniques. This information includes the laser beam quality as a function of laser power, and the laser beam diameter on the injection lenses. The fiber diameter is also stored. Likewise, actual lens focal lengths are determined with the laser source. The information is used to calculate the laser beam focused spot size on the fiber face as a function of laser power. Laser power monitoring, standard on many solid state lasers, is also fed into the control computer. Assuming a long injection focal length lens has been selected for fiber injection, as the laser is turned on the laser power is monitored by the control computer. Focused spot sizes are calculated at all laser power levels to ensure the focused spot size is smaller than the fiber diameter. If it is not, the control computer will address the next shortest focal length for fiber injection. Automated injection of the laser beam injection can be incorporated by using the teachings of commonly assigned U.S. Pat. No. 4,984,885, "Method and Apparatus for High Power Optical Fiber Injection and Alignment".

Figure 6:
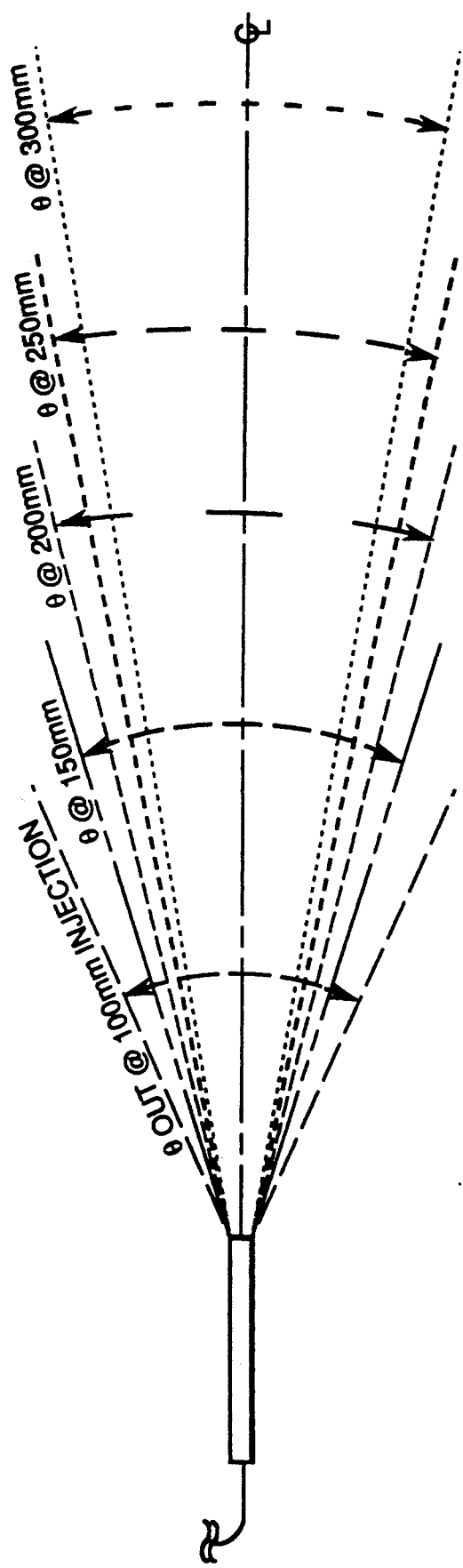
FIG. 6 is a diagrammatical illustration which shows how the fiber output divergence changes as the focal length of the injection lens is changed, and thus improving the fiber delivered beam quality.

As shown in FIG. 6, there is a diagrammatical illustration of how the fiber output divergence changes as the focal length of the injection lens is changed, and thus the fiber delivered beam quality. As discussed earlier, as the fiber output divergence decreases, the fiber delivered beam quality improves.

Once given the above disclosure, many other features, modification or improvements will become apparent to the skilled artisan. Such features, modifications or improvements are, therefore, considered to be a part of this invention, the scope of which is to be determined by the following claims.

What is claimed is:

1. A fiber optic delivered beam quality control system for power lasers, wherein said system is comprised of:
   a laser head means which produces a first laser beam;
   a laser power supply means operatively connected to said laser head means;
   a laser control means operatively connected to said laser head means and said laser power supply means;
   an optical control means operatively connected to said laser control means such that said optical control means moves into and out of alignment with said first laser beam to create a second laser beam;
   a fiber holder means having an optical fiber such that said second laser beam contacts said optical fiber; and
   a fiber output means operatively connected to said optical fiber.

2. The system, as in claim 1, wherein said optical control means is further comprised of:
   an optics means; and
   a translational means operatively connected to said optics means.

3. The system, as in claim 2, wherein said optics means is further comprised of:
   at least two plano-convex injection lenses of different predetermined focal lengths.

4. The system, as in claim 2, wherein said translational means is further comprised of:
   high speed solenoids.

5. The system, as in claim 1, wherein said fiber holder means is further comprised of:
   a fiber holder; and
   a fiber manipulator.

6. A method for controlling a fiber optic delivered beam quality for power lasers including a laser head means, a laser control means, an optical control means having a lens means and a translational means, a fiber holder means having an optical fiber, and a fiber output means, wherein said method is comprised of the steps of:
   predetermining a desired fiber optic delivered beam quality;
   operating said laser head means by said laser control means to produce a first laser beam;
   directing said first laser beam substantially towards said fiber holder means;
   operating said optical control means by said laser control means to produce a second laser beam;
   contacting said second laser beam with said fiber holder means;
   transmitting said second laser beam through said optical fiber;
   delivering said second laser beam from said fiber output means;
   determining an actual laser beam quality delivered from said fiber output means;
   comparing said actual laser beam quality to said predetermined desired beam quality; and adjusting, if necessary, said optical control means so that said actual laser beam quality substantially generates a predetermined desired fiber delivered beam quality.

7. The method, as in claim 6, wherein said step of operating said optical control means is further comprised of the steps of:

operating said translational means; and aligning said lens means with said first laser beam in order to form said second laser beam.

8. The method, as in claim 6, wherein said step of contacting said second laser beam with said fiber holder means is further comprised of the step of:

manipulating said fiber holder means such that an end of said optical fiber is substantially aligned with said second laser beam.

* * * * *